United States Patent [19]
Gagliardi, Jr.

[11] Patent Number: 5,297,984
[45] Date of Patent: Mar. 29, 1994

[54] METHOD FOR MAKING A FOOD PRODUCT FROM THE LEG OF A BIRD OR OTHER ANIMAL AND A FOOD PRODUCT RESULTING THEREFROM

[75] Inventor: Eugene D. Gagliardi, Jr., West Chester, Pa.

[73] Assignee: Designer Foods, Inc., Wilmington, Del.

[21] Appl. No.: 834,759

[22] Filed: Feb. 12, 1992

[51] Int. Cl.$^5$ ............................................. A22C 21/00
[52] U.S. Cl. ................................... 452/136; 452/166; 426/518
[58] Field of Search .............. 452/136, 135, 138, 137, 452/166, 109

[56] References Cited

U.S. PATENT DOCUMENTS

| | | | |
|---|---|---|---|
| 3,412,425 | 11/1968 | Sturm | 452/138 |
| 4,488,332 | 12/1984 | Atteck et al. | 452/136 |
| 4,942,642 | 7/1990 | Frankhauser, II et al. | 452/136 |
| 4,993,113 | 2/1991 | Hazenbroek | 452/136 |
| 5,030,163 | 7/1991 | Mielnik | 452/136 |
| 5,173,076 | 12/1992 | Hazenbroek | 452/138 |

FOREIGN PATENT DOCUMENTS 3741121  6/1989  Fed. Rep. of Germany ...... 452/136

Primary Examiner—Willis Little
Attorney, Agent, or Firm—Panitch Schwarze Jacobs & Nadel

[57] ABSTRACT

A method of making a food product from the leg of a bird wherein the leg has a thigh end, a foot end, an elongated bone extending generally from the thigh end to the foot end, and meat surrounding and attached to the bone. The method comprises the steps of severing at least a first portion of the meat from the bone proximate the thigh end while leaving a second portion of the meat distal from the thigh end attached to the bone. The first portion of the meat is moved toward the foot end to expose a portion of the bone at least proximate the thigh end. At least part of the exposed portion of the bone is severed and removed. The first portion of the meat is then moved toward the thigh end so that the first portion of the meat extends outwardly from the remaining part of the bone to provide a leg food product which is boneless at its thigh end and includes a bone at its foot end.

11 Claims, 2 Drawing Sheets

METHOD FOR MAKING A FOOD PRODUCT FROM THE LEG OF A BIRD OR OTHER ANIMAL AND A FOOD PRODUCT RESULTING THEREFROM

BACKGROUND OF THE INVENTION

The present invention relates to a method of making a food product from the leg of a bird or other animal, as well as the food product produced thereby and, more particularly, to such a food product which is at least partially boneless.

The description of the present invention as set forth below relates primarily to a method for making a food product from a bird, including fowl, poultry, etc., specifically, the lower portion of the leg or drumstick of a bird. It will be appreciated by those skilled in the art that although not discussed in significant detail below, the method of the present invention is also applicable to the preparation of a food product from the leg or limb of other animals utilizing substantially the same method steps.

Birds, such as poultry and fowl, are conventionally eviscerated and dressed and sold either as a whole or as severed parts, i.e., breasts, thighs, wings, etc. One of the parts which is often separately sold is the lower portion of the leg, generally referred to as the drumstick. Typically, drumsticks are sold with the skin in place and with the meat surrounding an elongated bone.

In recent years, there has been an increasing demand for meat products which require less time for preparation and are boneless or partially boneless, making such products easier to consume. Hence, products such as boneless chicken breasts, chicken tenders, etc., have enjoyed tremendous commercial success. Other bird parts, such as wings, have enjoyed an increase in popularity because of the development of new and different preparation methods and/or marketing techniques, i.e., "hot wings", "buffalo wings", etc. Until recently, some bird parts, such as thighs and drumsticks, have not been amenable to such enhanced commercial processing and/or preparation methods for a variety of reasons related primarily to the size of the parts, the type of meat (dark versus light), the size and location of the bone, etc.

The present invention comprises a method of efficiently and economically dressing or preparing the leg or drumstick of a bird by removing a portion of the centrally located bone in order to provide a meat product which is essentially boneless, at least on one end. A portion of the bone is retained in order to maintain stability of the meat product and to facilitate serving and holding the prepared food product during consumption. The present invention also comprises the semi-boneless drumstick product which is prepared in accordance with the present invention.

SUMMARY OF THE INVENTION

Briefly stated, the present invention comprises a method of making a food product from the leg of a bird, the leg having a thigh end, a foot end, an elongated bone extending generally from the thigh to the foot end, and meat surrounding and attached to the bone. In performing the method of the present invention, at least a portion of the meat is severed from the bone proximate the thigh end while leaving a second portion of the meat distal from the thigh end attached to the bone. The severed first portion of the meat is moved toward the foot end to expose a portion of the bone, at least proximate the thigh end. At least part of the exposed portion of the bone is severed and removed. The first portion of the meat is then moved toward the thigh end so that the first portion of the meat extends outwardly from the remaining part of the bone to provide a leg food product which is boneless at its thigh end and includes a bone at its foot end. The present invention also comprises the food product produced by the foregoing method.

BRIEF DESCRIPTION OF THE DRAWINGS

The foregoing summary, as well as the following detailed description, will be better understood when read in conjunction with the appended drawings. For the purpose of illustrating the invention, there is shown in the drawings an embodiment which is presently preferred, it being understood, however, that this invention is not limited to the precise arrangements and instrumentalities shown. In the drawings.

DETAILED DESCRIPTION OF PREFERRED EMBODIMENT

Figure 1:
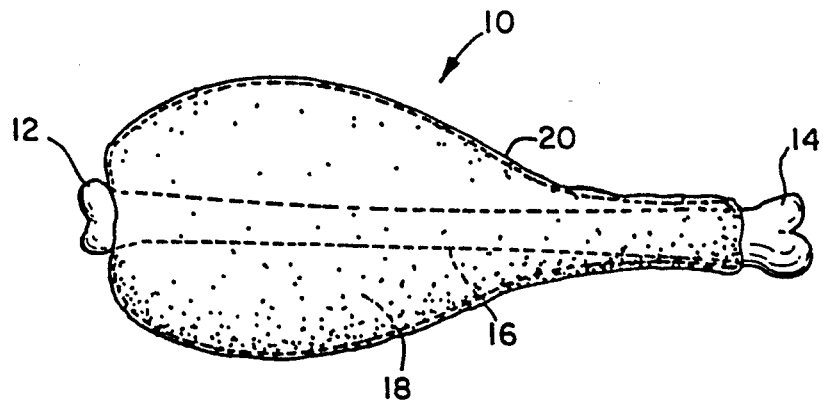
FIG. 1 is an elevational view of an undressed leg or drumstick of a bird.

Referring to the drawings in detail, wherein like numerals indicate like elements throughout, there is shown in FIG. 1 an elevational view of an undressed leg or drumstick 10 of a bird, preferably fowl or poultry. The drumstick 10 is of a type which is generally well known in the art and includes a first or thigh end 12 which, prior to butchering, had been connected to the thigh (not shown) of a bird, and a second or foot end 14 which, prior to butchering, had been connected to the foot (not shown) of the bird. The drumstick 10 further includes an elongated bone 16 extending substantially the entire length of the drumstick 10 from the thigh end 12 to the foot end 14 in a manner well known in the art. The bone 16 is substantially surrounded by meat 18 in a manner which is also well known in the art. In general, the meat of a drumstick 10 is considered to be "dark meat" and is characterized as being moister and more flavorful than meat from other parts of a bird.

The meat 18 extends generally radially outwardly from the bone 16 a predetermined diameter proximate the thigh end 12 of the drumstick 10 and the thickness of the meat 18 tapers inwardly to a second predetermined smaller diameter proximate the foot end 14 as illustrated. The thickness of the meat 18 and the distance that the meat 18 extends along the axial length of the bone 16 will vary depending upon the type of bird and the weight or size of the bird from which the drumstick 10 comes. The bulk of the meat 18 is generally positioned proximate the thigh end 12 and the thickness of the meat 18 generally diminishes when moving toward the foot end 14 so that there is little or no meat located proximate the foot end 14.

In general, the drumstick meat 18 is surrounded by a covering of skin 20 as is well known to those skilled in the art. The thigh end 12 and the foot end 14 of the bone 16 may include some fat, gristle or cartilage (not shown). The skin 20 and the fat, gristle and cartilage are not pertinent to the present invention and, therefore, will not hereinafter be discussed.

The drumstick 10 as thus far described and as shown in FIG. 1 is typical of the type of drumstick available from a butcher, supermarket, etc. The overall length of the drumstick 10 and the bone 16 may vary greatly depending upon the type of fowl or poultry and depending upon other factors including the age and weight of the bird from which the drumstick 10 comes. In addition, the thickness of the meat 18 on the drumstick 10 will vary depending upon the type of fowl or poultry, etc. It will be appreciated by those skilled in the art that the size or length of the drumstick 10 as well as the amount or thickness of the meat 18 does not matter to the present invention which is equally applicable to any size drumstick or any amount of meat. It will also be appreciated by those skilled in the art that the present invention is equally applicable to any type of bird, including fowl, poultry, etc., as well as to other types of animal legs or limbs.

Figure 5:
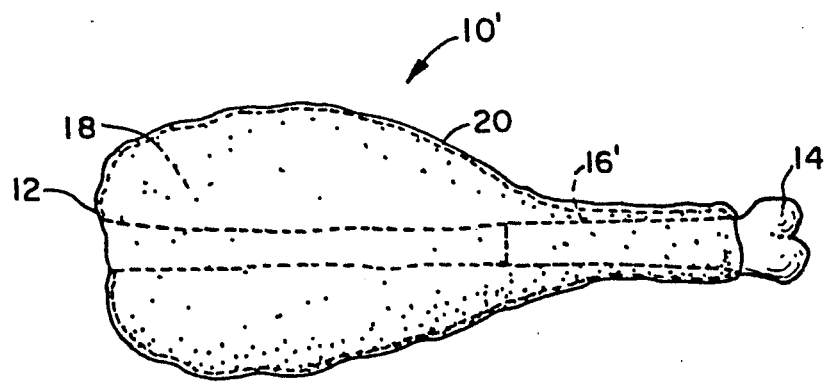
FIG. 5 is an elevational view of a drumstick food product in accordance with the present invention.

The present invention is comprised of a method of making a partially boneless food product from a leg or drumstick 10 of a bird of the type described above. FIG. 5 illustrates a partially boneless bird leg food product 10' made in accordance with the present invention. As can be seen, a portion of the bone proximate the thigh end 12 has been removed while a portion of the bone 16' proximate the foot end 14 remains. Thus, the leg food product is substantially boneless proximate the thigh end 12 thereby facilitating consumption without having to be concerned about eating around the bone 16. The foot end 14 of the bone 16' remains in order to hold the food product together, provide stability, and to provide a convenient means for grasping the leg food product 10' during cooking or other preparation and consumption.

The leg food product 10' in the present embodiment is made by severing or stripping at least a first portion of the meat 18 from the bone 16 proximate the thigh end 12. The severed first portion of the meat 18 is also moved toward the foot end 14 of the bone 16 to expose a portion of the bone 16 at least proximate the thigh end 12 and preferably extending toward the foot end 14 for a substantial portion of the total length of the bone 16. It will be appreciated by those skilled in the art that the severing and movement of the first portion of the meat 18 may be accomplished as a single step or a multistep process. In the presently preferred embodiment, the first portion of the meat 18 is moved toward the foot end 14 so that all but approximately 4 cm (1.5 inches) of the bone 16 proximate the foot end 14 is exposed. A second portion of the meat 18 proximate the foot end 14 of the bone 16 remains attached to the bone (see FIG. 5).

After the first portion of the meat 18 has been severed from the bone 16 and moved toward the foot end 14, at least part of the exposed portion of the bone 16 is severed and removed from the remaining portion of the bone 16'. In the illustrated embodiment, preferably all but about 4 cm (1.5 inches) of the bone 16' proximate the foot end 14 is severed and removed. Thus the remaining portion of the bone 16' is about 4 cm (1.5 inches) in length. It will be appreciated by those skilled in the art that the distance that the first portion of the meat 18 is moved toward the foot end 14, as well as the length of bone 16 which is severed and removed, will vary depending upon many factors, including the type of bird, the thickness of the meat, the length of the meat, etc. In addition, the length of the severed part of the bone 16 may vary depending upon the particular end application.

Figure 2:
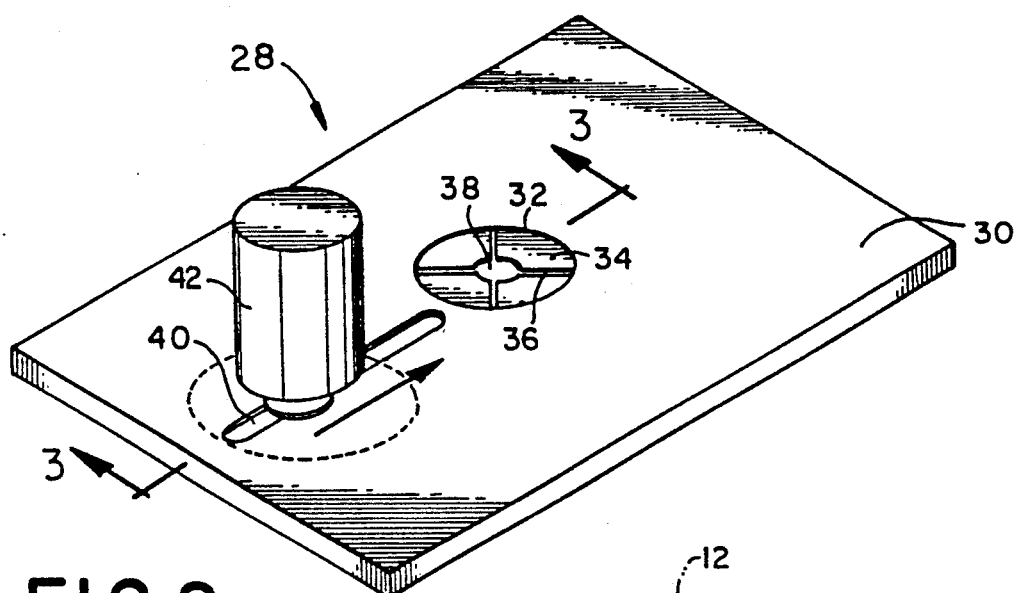
FIG. 2 is a schematic representation of a preferred embodiment of an apparatus employed in practicing the method of the present invention.
Figure 3:
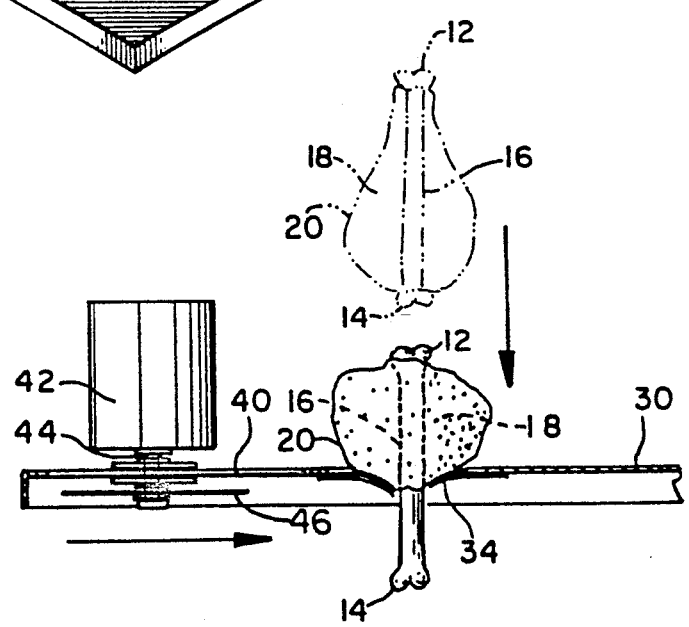
FIG. 3 is a sectional schematic view taken along line 3—3 of the apparatus of FIG. 2 with a bird leg in position to illustrate a portion of the method of the present invention.

FIGS. 2 and 3 are schematic representations of a presently preferred apparatus 2 for practicing the above-described method. The apparatus 28 is comprised of a generally flat supporting surface 30 preferably made of stainless steel or some other relatively high strength material compatible with the preparation of food. An opening 32 extends through the supporting surface 30. A first die member is comprised of a plurality of generally rigid, flexible members 34, each of which are attached to the supporting surface 30 around the opening 32 and extend inwardly into the opening 32. The members 34 are spaced apart by an equal plurality of elongated slots 36 and a generally circular central opening 38 where the ends of the members 34 would meet each other. The central opening 38 is preferably sized to have a diameter which is about the same size as, but may be slightly smaller than, the largest radial dimension of the bone 16 of drumstick 10. In the illustrated embodiment, there are four members 34 and four slots 36. It will be appreciated by those skilled in the art that the number of members 34 of the die member and the number of slots 36 may vary depending upon the particular application. It will also be appreciated by those skilled in the art that the size of the central opening 38 may also vary in order to accommodate drumsticks having bones of greatly different diameters.

In using the presently preferred apparatus 28, the drumstick 10 is positioned on one side of the supporting surface 30 with the bone 16 axially aligned with the central opening 38 and with the thigh end 12 facing the members 34. The drumstick 10 is then pushed toward the supporting surface 30 so that the thigh end 12 of the bone 16 extends through the central opening 38. At the same time, the members 34 engage and sever the first portion of the meat 18 from the bone 16 and push the first portion of the meat 18 toward the foot end 14 as illustrated in FIG. 3.

The apparatus 28 also includes an elongated slot 40 (FIG. 2) extending through the supporting surface 30. On one side of the slot 40 is positioned a driving motor such as an electric motor 42 with its drive shaft 44 extending through the slot 40 to the other side of the supporting surface 30. A cutting or saw blade 46 (best shown in FIG. 3) is secured to the drive shaft 44 on the other side of the supporting surface 30. Operation of the motor 42 causes rotation of the saw blade 46 in a manner well known in the art. As will also be appreciated by those skilled in the art, movement of the motor 42 along the slot 40 permits the rotating saw blade 46 to engage and sever the portion of the bone 16 extending beyond the supporting surface 30 as shown in FIG. 3. It will be appreciated by those skilled in the art that while, in the presently illustrated embodiment, the supporting surface 30 is shown as being horizontal, the supporting surface 30 could be at any other orientation, including a vertical orientation. In addition, it will be appreciated by those skilled in the art that any other means could be employed to sever the portion of the bone 16 such as a scissor type mechanism or pivoting blade.

Figure 4:
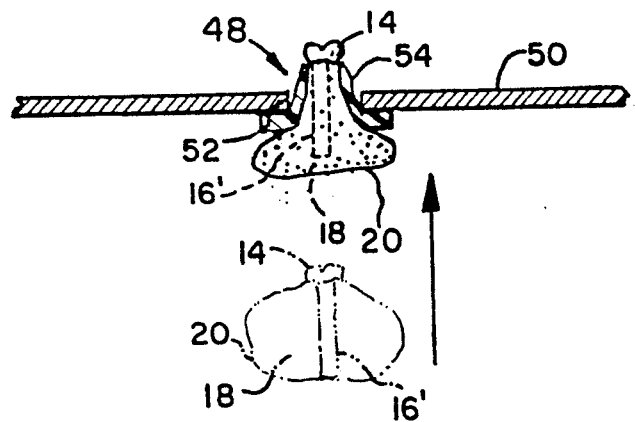
FIG. 4 is a sectional schematic representation of a preferred embodiment of another apparatus employed in practicing the present invention with a bird leg in place to illustrate a portion of the method.

The final step in completing the partially boneless food product 10' is moving the first portion of the meat 18 toward the thigh end 12 after the bone part has been severed and removed in order to provide the food product illustrated in FIG. 5. FIG. 4 schematically illustrates an apparatus 48 for achieving this step. The apparatus 48 includes a generally flat supporting surface 50 having an opening 52 with a second die member comprised of a plurality of generally flexible members 54 attached to the supporting surface 50 and extending inwardly from the opening 52. The flexible members 54 are separated by a plurality of elongated slots (not shown) and a generally circular central opening (not shown) where the ends of the members 54 would meet. Essentially, the structure of the apparatus 48 of FIG. 4 is similar to the structure of the apparatus 28 of FIGS. 2 and 3. However, in the apparatus 48 of FIG. 4, the flexible members 54 of the second die member are formed of a generally flexible plastic material or some other generally flexible soft material adapted for use in the preparation of food products and the central opening is preferably of a diameter large enough to receive the foot end 14 of the bone 16 and at least a portion of the meat 18 located proximate the foot end 14.

As illustrated in FIG. 4, inserting the drumstick 10 through the opening 56 by inserting the foot end 14 first results in the flexible members 54 pushing or moving the first portion of the meat 18 toward the thigh end 12. Preferably, the meat 18 occupies substantially the same position it originally occupied (FIG. 1) except the thigh end 12 portion of the bone 16 has been removed.

It will, of course, be appreciated by those skilled in the art that any other apparatus or means may be employed for moving the first portion of the meat 18 toward the thigh end 12, including the use of a shroud or air column. Alternatively, the first portion of the meat could be moved toward the thigh end 12 by hand. It will also be appreciated by those skilled in the art that other means could be employed for severing and moving the first portion of the meat 18 toward the foot end 14, and that the apparatus 28 of FIGS. 2 and 3 and the apparatus 48 of FIG. 4 are shown merely to illustrate one way of performing the present method.

From the foregoing description, it can be seen that the present invention comprises a new and unique method of making a partially boneless food product from the leg of a bird or other animal, and a food product resulting therefrom. It will be recognized by those skilled in the art that changes could be made to the above-described embodiment of the invention without departing from the board inventive concepts thereof. It is understood, therefore, that this invention is not limited to the particular embodiment disclosed, but is intended to cover all modifications which are within the spirit and scope of the invention as defined by the appended claims.

I claim:

1. A method of making a food product from the leg of a bird, the leg having a thigh end, a foot end, an elongated bone extending generally from the thigh end to the foot end and meat surrounding and attached to the bone, the method comprising the steps of:
   severing at least a first portion of the meat from the bone proximate the thigh end while leaving a second portion of the meat distal from the thigh end attached to the bone;
   moving the first portion of the meat toward the foot end to detach said first meat portion from a portion of the bone and expose said portion of the bone at least proximate the thigh end; and
   severing and removing at least part of the exposed portion of the bone.

2. The method as recited in claim 1 further including the step of moving the first portion of the meat toward the thigh end after the bone part has been severed and removed so that the first portion of the meat extends outwardly from the remaining part of the bone to provide a leg food product which is boneless at its thigh end and includes a bone at its foot end.

3. The method as recited in claim 1 wherein the first portion of the meat extends from the thigh end to about 4 cm (1.5 inches) from the foot end.

4. The method as recited in claim 3 wherein the bone is severed about 4 cm (1.5 inches) from the foot end.

5. The method as recited in claim 1 wherein the first portion of the meat is severed from the bone and moved toward the foot end in a single action.

6. The method as recited in claim 5 wherein the single action comprises moving the thigh end of the drumstick through a die member opening having a predetermined size and shape for receiving the bone.

7. The method as recited in claim 2 wherein the first portion of the meat is moved toward the thigh end by passing the leg through a die member, the foot end of the leg passing through the die member first.

8. A food product produced by the method of claim 1.

9. A food product produced by the method of claim 2.

10. A method of making a food product from the limb of an animal, the limb having a first end, a second end, an elongated bone extending generally from the first end to the second end and meat surrounding and attached to the bone, the method comprising the steps of:
    severing at least a first portion of the meat from the bone proximate the first end while leaving a second portion of the meat distal from the first end attached to the bone;
    moving the first portion of the meat toward the second end to detach said first meat portion from a portion of the bone and expose said portion of the bone at least proximate the first end;
    severing and removing at least part of the exposed portion of the bone; and
    moving the first portion of the meat toward the first end after the bone part has been severed and removed so that the first portion of the meat extends outwardly from the remaining part of the bone to provide a leg food product which is boneless at its first end, and includes a bone at its second end.

11. A food product produced by the method of claim 10.

* * * * *